United States Patent Office 2,735,854
Patented Feb. 21, 1956

2,735,854

STEROID COMPOUNDS

Milton E. Herr, Kalamazoo Township, Kalamazoo County, Mich., assignor to The Upjohn Company, a corporation of Michigan No Drawing. Application March 11, 1955,
Serial No. 493,807

3 Claims. (Cl. 260—397.45)

This invention pertains to steroid compounds related to testosterone and is more particularly concerned with novel 11β-hydroxy-17α-methyltestosterones of the formula

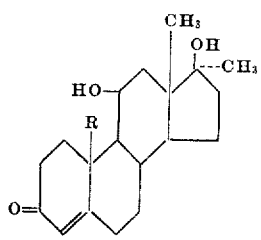

wherein R is hydrogen or methyl.

It is an object of this invention to provide the 11β-hydroxy-17α-methyltestosterones of the above formula, which are orally active anabolic agents having a higher oral anabolic activity and a higher ratio of oral anabolic to androgenic activity than closely related compounds such as 11α-hydroxy-17α-methyltestosterone, 11β-hydroxytestosterone, 11α-hydroxytestosterone and 17α-methyltestosterone. Other objects and uses will be apparent to one skilled in the art.

The oral anabolic activity and ratio of oral anabolic to androgenic activity of the 11β-hydroxy-17α-methyltestosterones of the present invention compared to closely related compounds is shown in the table which summarizes the results of biological testing. The 17-monoacylates and 11,17-diacylates of the 11β-hydroxy-17α-methyltestosterones of the above formula, wherein an acylate radical is acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, also are useful for the same purpose.

TABLE

| Test Compound | Potency Ratio of Test Compound to 17α-Methyltestosterone | | Ratio of Anabolic to Androgenic Activity | Relative Weights of Test Compounds Producing Equal Anabolic Effects |
|---|---|---|---|---|
| | Oral Androgenic Activity | Oral Anabolic Activity | | |
| 17α-Methyltestosterone (Standard). | 1.0 | 1.0 | 1.0 | 1.00 |
| 11β-Hydroxy-17α-methyl-testosterone. | 0.8 | 2.8 | 3.5 | 0.36 |
| 11α-Hydroxy-17α-methyl-testosterone. | 0.25 | 0.70 | 2.8 | 1.43 |
| 11β-Hydroxytestosterone | 0.31 | 0.35 | 1.1 | 2.86 |
| 11α-Hydroxytestosterone | Inactive | Inactive | | |

In the table, "Potency Ratio of Test Compound to 17α-Methyltestosterone" was determined by administering the test compounds orally in equal daily doses of 0.2 milligram in 0.2 milliliter of cottonseed oil to 26 to 27-day-old castrate, male rats for 9 days; and, at autopsy on the day following the last oral dose, determining the body weight, seminal vesicle weight, and levator ani muscle weight; the weight of the seminal vesicle per 100 grams of body weight being used as an index of androgenic activity, and the weight of the levator ani muscle per 100 grams of body weight being used as an index of anabolic activity. From the table, it can be seen that 11β-hydroxy-17α-methyltestosterone has distinctive superiority in the high ratio of oral anabolic activity to androgenic activity as well as in requiring a smaller dosage to obtain equal anabolic effects.

The 11β-hydroxy-17α-methyltestosterones of the present invention can be readily prepared from the corresponding 11-keto-17α-methyltestosterones (U. S. 2,678,933) by first protecting the 3-keto group with a protecting group, e. g., an enamine group, or a ketal group, then reducing the 11-keto group to an 11β-hydroxy group, e. g., with LiAlH₄, and finally hydrolyzing the protecting group at the 3-position to regenerate the 3-keto group. The 11β-hydroxy-17α-methyltestosterones of the present invention can also be prepared from the corresponding 11β-hydroxy-4-androstene-3,17-diones by first protecting the 3-keto group with a protecting group, e. g., an enamine group, or a ketal group, then converting the 17-keto group to a 17β-hydroxy-17α-methyl grouping by reaction with methyl magnesium halide Grignard reagent, and finally hydrolyzing the protecting group at the 3-position to regenerate the 3-keto group. The 11β-hydroxy-17α-ethyltestosterones prepared by the same methods have similar anabolic activity.

The following examples are illustrative and are not to be construed as limiting the invention.

Example 1

One-half gram of 11-keto-17α-methyltestosterone was dissolved in three milliliters of absolute methanol and mixed with one-half milliliters of pyrrolidine at a temperature of about fifty degrees centigrade. The mixture was allowed to cool to room temperature, and, after about one-half hour, the 3-enamine product [3-(N-pyrrolidyl)-17α-methyl-17β-hydroxy-3,5-androstadien-11-one] which had precipitated was removed by filtration and dried under vacuum. The yield of high purity 3-enamine product was 0.452 gram melting at 180 to 195 degrees centigrade with decomposition.

The foregoing process was repeated using 1.52 grams of 11-keto-17α-methyltestosterone in ten milliliters of methanol mixed with 0.75 milliliter of pyrrolidine. The yield of 3-enamine product was 1.36 grams melting above 180 degrees centigrade with decomposition.

The identical procedure, in which 11-keto-17α-methyltestosterone is replaced by 11-keto-10-normethyl-17α-methyltestosterone, produced the corresponding 10-normethyl 3-enamine.

Example 2

A solution of 1.79 grams of the 11-keto-17α-methyltestosterone 3-enamine from Example 1 in a mixture of 25 milliliters of thiophene-free benzene and 25 milliliters of anhydrous ether was added dropwise with mechanical stirring to a mixture of one-half gram of lithium aluminum hydride and 85 milliliters of dry ether. This addition required above five minutes; and stirring was continued for an additional fifteen minutes. Then with stirring, ten milliliters of ethyl acetate was cautiously added dropwise, followed by ten milliliters of water. The resulting mixture was concentrated in vacuo to a thick slurry. One-hundred milliliters of methanol then was added and the mixture stirred for ten minutes at a temperature of about fifty degrees centigrade. Then eighteen milliliters of five percent aqueous sodium hydroxide was added and stirring continued at the same temperature for another ten minutes. After addition of five milliliters of acetic acid the mixture was concentrated in vacuo. A mixture of fifty milliliters of water and eight milliliters of concentrated hydrochloric acid was added, and the solid product was recovered by filtration, washed with water, and dried in air. The yield of 11β-hydroxy-17α-methyltestosterone was 1.29 grams; melting point 207 degrees centigrade. Recrystallization from a methylene chloride-Skelly-solve B (mixture of hexanes) mixture gave 0.977 grams of purified product; melting point 209 to 211 degrees centigrade; $[\alpha]_D^{23}$ is plus 128 degrees in chloroform.

*Analysis.*—Calculated for $C_{20}H_{30}O_3$: C, 75.44; H, 9.49. Found: C, 75.14; H, 9.85.

In the foregoing procedure, replacing 11-keto-17α-methyltestosterone 3-enamine, by the corresponding 10-normethyl 3-enamine provides the 10-normethyl derivative of 11β-hydroxy-17α-methyltestosterone, i. e., 11β-hydroxy-17α-methyl-19-nortestosterone.

Example 3

A solution of 3.02 grams (0.01 mole) of 11β-hydroxy-4-androstene-3,17-dione in methanol at sixty degrees centigrade was mixed with 1.5 milliliters of pyrrolidine. A heavy precipitate separated almost immediately. After standing for one hour at room temperature followed by one hour at five degrees centigrade the resulting precipitate was removed by filtration, washed with methanol and dried under vacuum. The yield of the 3-(N-pyrrolidyl)-11β-hydroxy-3,5-androstadien-17-one was 3.30 grams; melting point above 185 degrees centigrade with decomposition; $[\alpha]_D^{23}$ is minus 81 degrees in chloroform.

*Analysis.*—Calculated for $C_{23}H_{33}NO_2$: C, 77.69; H, 9.36. Found: C, 78.09; H, 9.55.

Example 4

Fifty milliliters of a clear ether solution of approximately four-molar methyl magnesium bromide was placed in a 3-necked, round-bottomed flask fitted with a water-cooled reflux condenser, stirrer, nitrogen inlet tube, and dropping funnel. With stirring, and under an atmosphere of nitrogen, a suspension of 3.12 grams of the 3-enamine from Example 3 in 250 milliliters of a 1:1 benzene-anhydrous ether mixture was added slowly during a ten-minute period. Ether was then distilled off slowly until the temperature of the reaction mixture when refluxing was approximately seventy degrees centigrade, and the reaction mixture heated at this temperature for four hours. The reaction mixture then was cooled in an ice-bath and fifty milliliters of a saturated aqueous ammonium chloride solution was cautiously added. The reaction mixture was then concentrated in vacuo, two hundred milliliters of methanol and thirty-five milliliters of five percent aqueous sodium hydroxide was added, and the resulting mixture stirred at a temperature of approximately forty degrees centigrade for about thirty minutes. The reaction mixture was acidified with twenty milliliters of acetic acid, concentrated in vacuo, the residue mixed with water, and extracted with methylene chloride. The extract was washed with water, dilute aqueous sodium hydroxide solution, and water, and dried over anhydrous sodium sulfate. Distillation of the solvent gave a white solid residue. Crystallization from a methylene chloride-Skellysolve B (mixture of hexanes) mixture and from dilute acetone gave 1.144 grams of 11β-hydroxy-17α-methyltestosterone; melting point 209 to 211 degrees centigrade; $[\alpha]_D^{23}$ is plus 132 degrees in chloroform.

*Analysis.*—Calculated for $C_{20}H_{30}O_3$: C, 75.44; H, 9.49. Found: C, 75.43; H, 9.42.

Example 5

A solution of 11β-hydroxy-17α-methyltestosterone in dry pyridine was treated with acetic anhydride, the molar ratio of steroid to acetic anhydride being about one to three, and the resulting mixture was heated under reflux for six hours. The mixture was then cooled, diluted with water while stirring, and the solid precipitate obtained removed by filtration. The solid was washed with two percent aqueous hydrochloric acid solution and with water, and then dried under vacuum. Recrystallization or chromatographic separation provides purified 11β-hydroxy-17α-methyltestosterone 17-acetate. In exactly the same manner 10-normethyl-11β-hydroxy-17α-methyltestosterone 17-acetate is obtained by using 10-normethyl-11β-hydroxy-17α-methyltestosterone as the starting steroid. Substituting the appropriate acylating agent, i. e. the appropriate acid anhydride, acid chloride or acid, for the acetic anhydride in the above process provides other 17-acylates of 11β-hydroxy-17α-methyltestosterone and 10-normethyl-11β-hydroxy-17α-methyltestosterone including the 17-formate, propionate, trimethylacetate, furoate, α or β-cyclohexylpropionate, benzoate, phenylacetate, α or β-cyclopentylpropionate, α or β-phenylpropionate, methylbenzoate, α or β-furylacrylate, valerate, methacrylate, and the like.

Example 6

A mixture of 11β-hydroxy-17α-methyltestosterone 17-acetate, a large excess of acetic anhydride to serve as both acylating agent and solvent, and a trace of the strongly acidic catalyst sulfuric acid were heated at a temperature of about one hundred degrees centigrade for twelve hours. The hot solution then was poured over cracked ice and the resulting mixture stirred until hydrolysis of the excess acetic anhydride was complete. The solid product which precipitated was removed by filtration, washed with water and dried under vacuum. Purified 11β-hydroxy-17α-methyltestosterone 11,17-diacetate was obtained by recrystallization or chromatographic separation. 10-normethyl-11β-hydroxy-17α-methyltestosterone 11,17-diacetate is obtained in exactly the same manner by substituting 10-normethyl-11β-hydroxy-17α-methyltestosterone for the above starting steroid. By substituting the appropriate acylating agent, i. e. the appropriate acid anhydride or isopropenyl acylate, in the above procedure other 11,17-diacylates of 11β-hydroxy-17α-methyltestosterone and 10-normethyl-11β-hydroxy-17α-methyltestosterone are obtained including the 11,17-dipropionate, di-(trimethylacetate), difuroate, di-(α or β-cyclohexylpropionate), dibenzoate, di-(phenylacetate), di-(α or β-cyclopentylpropionate), di-(α or β-phenylpropionate), di-(methylbenzoates), di-(α or β-furylacrylates), di-valerate, di-(methacrylate), 11-acetate 17-formate, 11-(β-cyclopentylpropionate) 17-acetate, and the like.

I claim:

1. An 11β-hydroxy-17α-methyltestosterone of the formula

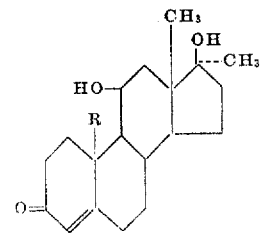

wherein R is selected from the group consisting of hydrogen and methyl.

2. 11β-hydroxy-17α-methyltestosterone of the formula
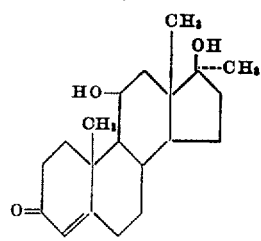
3. 11β-hydroxy-17α-methyl-19-nortestosterone of the formula
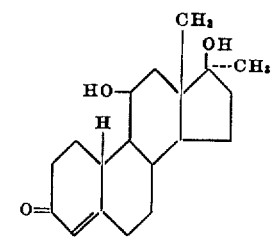
No references cited.

Notice of Adverse Decision in Interference

In Interference No. 88,435 involving Patent No. 2,735,854, M. E. Herr, Steroid compounds, final judgment adverse to the patentee was rendered June 28, 1957, as to claim 2.

[*Official Gazette August 27, 1957.*]

Disclaimer 2,735,854.—*Milton E. Herr*, Kalamazoo Township, Kalamazoo County, Mich. STEROID COMPOUNDS. Patent dated Feb. 21, 1956. Disclaimer filed July 21, 1958, by the assignee, *The Upjohn Company*.

Hereby enters this disclaimer to claim 2 of said patent.

[*Official Gazette August 26, 1958.*]